United States Patent
Saeva

[11] 3,957,346
[45] May 18, 1976

[54] METHOD FOR ALTERING ELLIPTICALLY POLARIZED LIGHT

[75] Inventor: Franklin D. Saeva, Webster, N.Y.

[73] Assignee: Xerox Corporation, Stamford, Conn.

[22] Filed: Mar. 26, 1975

[21] Appl. No.: 562,303

[52] U.S. Cl. .............................. 350/150; 350/154; 350/160 LC
[51] Int. Cl.² .......................................... G02F 1/13
[58] Field of Search ............. 350/150, 154, 160 LC

[56] References Cited
UNITED STATES PATENTS 3,780,307    12/1973    Saeva .......................... 350/150 X

*Primary Examiner*—Edward S. Bauer
*Attorney, Agent, or Firm*—James J. Ralabate; Michael H. Shanahan; George J. Cannon

[57] ABSTRACT

The optical transitions of twisted nematic liquid crystalline compositions exhibit circular dichroism. The circular dichroism in twisted nematic liquid crystalline compositions is utilized to alter the relative amounts of left and right hand circularly polarized light in elliptically polarized light, including producing circularly polarized light.

12 Claims, 3 Drawing Figures

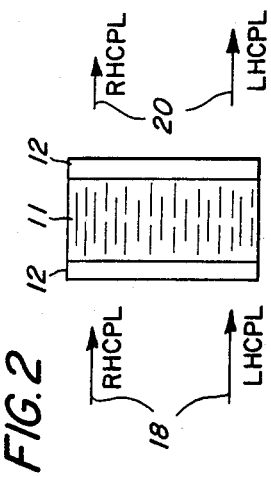
*FIG.2*
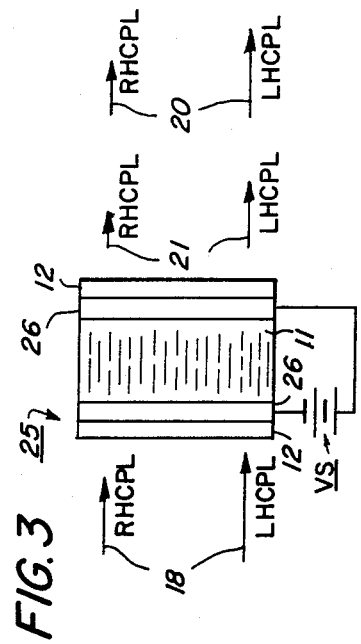
*FIG.3*
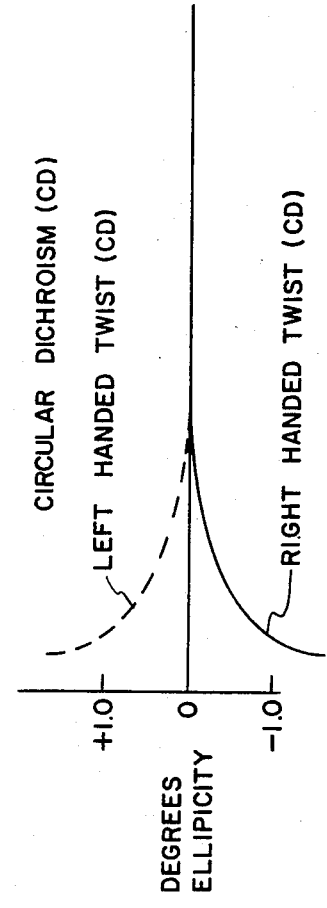
*FIG.1*
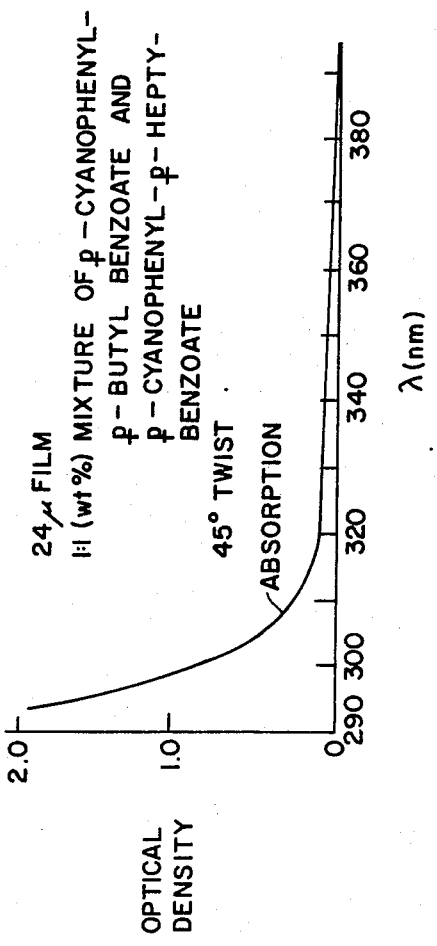

METHOD FOR ALTERING ELLIPTICALLY POLARIZED LIGHT

BACKGROUND OF THE INVENTION

This invention relates to liquid crystalline compositions and, particularly, to uses of the twisted nematic structure in nematic liquid crystalline compositions. More particularly, this invention relates to specific uses of the discovery that circular dichroism is exhibited within absorption bands of nematic liquid crystalline compositions in the twisted nematic structure.

Liquid crystalline substances exhibit physical characteristics, some of which are typically associated with liquids and others which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

The twisted nematic structure is well known in the art. When a nematic liquid crystalline material is sandwiched between substrates treated for unidirectional homogeneous alignment, the nematic is externally perturbed into a helical structure when the rubbed surfaces are placed at some angle (other than 0°) with respect to one another. See, for example, M. Schadt and W. Helfrich, *Appl. Phys. Letts.*, 18, 127 (1971), "Voltage-Dependent Optical Activity of a Twisted Nematic Liquid Crystal."

Twisted nematic cells have been employed in display devices, particularly where electro-optic effects are modulated by the application of an electrical field across layers of nematic liquid crystalline material in the twisted nematic structure. See, for example, U.S. Pat. No. 3,731,986 to Fergason and U.S. Pat. No. 3,781,085 to Leibowitz.

The molecules of the nematic in the twisted structure of nematic liquid crystals can be thought of as arranged in very thin layers with the long axis of the molecules parallel to each other and to the local optic axis of the layers. The direction of the long axes of the molecules in each layer is displaced slightly from the corresponding direction in adjacent layers. This displacement is cumulative over successive layers to that overall displacement traces out a helical path. A comprehensive description of the optical properties of the twisted nematic structure of nematic liquid crystals is given in "Optics in Smoothly Varying Anisotropic Planar Structures: Application to Liquid Crystal-Twist Cells", D. W. Berreman, 63, *J. Opt. Soc. Am.*, 1374 (1973).

Nematic liquid crystals in the twisted structure rotate the plane of polarization of light passing therethrough an amount between 0° and 90° equal to the angular difference between the alignment directions of the substrates. The intrinsic sense of the helical twist can be either right-handed or left handed.

Extremely large extrinsic circular dichroism has been observed within the electronic transitions of achiral (optically inactive) solutes dissolved in cholesteric mesophases as reported in recently issued U.S. Pat. No. 3,780,304 to F. D. Saeva, et al and in the following articles by F. D. Saeva et al appearing in the *Journal of the American Chemical Society* (JACS): "Cholesteric Liquid-Crystal-Induced Circular Dichroism (LCID) of Achiral Solutes. A Novel Spectroscopic Technique", Vol. 94, JACS, page 5135 (1972); "Cholesteric Liquid-Crystal-Induced Circular Dichroism (LCICD) V. Some Mechanistic Aspects", Vol. 95, JACS, page 7675 (1973); "Cholesteric Liquid-Crystal-Induced Circular Dichroism (LCICD) VI. LCICD Behavior of Benzene and Some of its Mono and Disubstituted Derivatives", Vol. 95, JACS, page 7660 (1973); and "Cholesteric Liquid-Crystal-Induced Circular Dichroism (LCICD) VII. LCID of Achiral Solutes in Lyotropic Cholesteric Mesophased", Vol. 95, JACS, page 7882 (1973).

To our knowledge, circular dichroism has not been previously reported as induced in absorption bands of the twisted structure of nematic liquid crystalline materials.

In rapidly growing areas of technology such as liquid crystals new methods, apparatus, compositions and articles of manufacture are often discovered for the application of the new technology in a new mode. The present invention relates to novel and advantageous uses of the twisted nematic structure of nematic liquid crystalline materials.

SUMMARY OF THE INVENTION

It is an object of the invention to provide an optical system which can be adapted to function as an optical filter system.

It is a further object of the invention to provide an optical filter system which will alter the relative magnitudes of left and right circular polarized light components in elliptically polarized light.

The above mentioned objects and advantages and others are realized in accordance with the invention by employing nematic liquid crystalline composition whose electronic transitions, i.e., effect obtained from the interaction of light energy with the electrons of molecules, become circularly dichroic (i.e., show a large preferential absorption of either left hand circularly polarized light (LHCPL) or right hand circularly polarized light (RHCPL) where in the twisted nematic structure. Elliptically polarized light having a wavelength within the absorption band of the nematic is directed through the twisted nematic structure and is altered in ellipticity by a change in relative amounts of right and left handed circularly polarized light or converted to circularly polarized light when complete absorption of one of RHCPL and LHCPL by the twisted nematic occurs. Optionally, a twisted nematic composition having positive dielectric anisotropy is employed between two electrodes and the existence or intensity of the circular dichroism exhibited by the twisted nematic is controlled by application of a voltage between the two electrodes.

The invention will be more fully understood from the following detailed description of various preferred embodiments thereof particularly when read in conjunction with the accompanying drawings wherein:

FIG. 1 shows the circular dichroism and absorption spectra of a 1:1 weight ratio of p-cyanophenyl-p-butyl benzoate and p-cyanophenyl-p-heptylbenzoate between 290–390 nm.

FIG. 2 is a schematic side cross-sectional view of a first embodiment of a typical optical filter constructed according to the invention.

FIG. 3 is a schematic side cross-sectional view of a second embodiment accordinng to the invention.

Referring now to FIG. 1, there is seen the circular dichroism and absorption spectrum from about 290 nm to about 390 nm of an about 24 micron thick film of a 1:1 weight ratio of p-cyanophenyl-p-butylbenzoate and p-cyanophenyl-p-heptyl benzoate when the nematic is provided with either a left handed 45° twist (dotted line) or a right-handed 45° twist (solid line) between the alignment directions of the top and bottom rubbed substrates. The circular dichroism in the absorption band depicted is negative in sign with the right handed twisted nematic; that is, more right handed circularly polarized light is absorbed than left-handed circularly polarized light ($\epsilon_R > \epsilon_L$). Conversely, more left-handed circularly polarized light is transmitted than right-handed circularly polarized light.

In the left handed twisted nematic, the circular dichroism is of positive sign ($\epsilon_L > \epsilon_R$). It has been found that the sign of the circular dichroism in a twisted nematic structure depends upon the pitch and sense of twist in the nematic. The CD sign is negative in a right-handed twisted nematic and is positive in a left-handed twisted nematic.

When a voltage is not applied to selectively vary the existence or intensity of circular dichroism, any suitable nematic liquid crystal substances, mixtures thereof, or combinations having nematic liquid crystalline characteristics may be employed in the invention. Typical suitable nematic liquid crystals include p-azoxyanisole, p-azoxyphenetole, p-butyoxybenzoic acid, p-methoxy-cinnamic acid, butyl-p-anisylidene-p-aminocinnamate, anisylide, p-aminophenyl-acetate, p-ethoxy-benzylamino-α-methyl-cinnamic acid, 1,4-bis-(p-ethoxy benzylidene) cyclohexanone, 4,4'-dihexyl-azoxybenzene, 4,4'-diheptylozyazoxy-benzene, anisal-p-amino-azo-benzene, anisal dazine, anils of the generic group (p-n-alkoxybenzylidene-p-n-alky-anilines), such as p-methoxy-benzylidene-p'-n-butylaniline; nematic compounds of the alkoxybenzylidene-amino-alkyphenone group, such as methoxybenzylidene-aminobutyrophenone and methoxybenzylidene-amino-valerophenone; p-cyanophenyl-p-butyl benzoate and p-cyanophenyl-p-heptylbenzoate; mixtures of the above and others. When a voltage is to be applied to selectively vary the intensity of circular dichroism or control the existence of circular dichroism, the nematic liquid crystalline composition is selected to have positive dielectric anisotropy. The selected composition of positive dielectric anisotropy can comprise any suitable nematic liquid crystalline material having positive dielectric anisotropy, or a mixture of nematic liquid crystalline materials with materials having positive dielectric anisotropy, or a mixture of positive and negative dielectric anisotropy nematics which yield a net positive dielectric anisotropy nematic composition.

Typical suitable nematic liquid crystalline materials having positive dielectric anisotropy are well known in the liquid crystalline art and need not be listed in detail herein. These include cyanoaniline compounds such as p-hexyloxybenzylidene-p'-cyanoaniline and p-heptyloxybenzylidene-p'-cyanoaniline disclosed by M. Schadt and W. Helfrich in *Appl. Phys. Letts.*, 18, 127 (1971); nematic esters such as p-cyanophenyl-p-butylbenzoate and p-cyanophenyl-p-heptylbenzoate, both available from Aldrich Chemical Company; and butyl-p, p-ethoxyphenoxy-carbonylphenyl carbonate, available from Eastman Chemical Products, Inc.

Typical suitable materials having positive dielectric anisotropy include smectic liquid crystalline materials having positive dielectric anisotropy such as p-methoxybenzylidene-p'-trifluoromethylaniline and p-heptyloxybenzylidene-p'-trifluoromethylaniline. These materials can be conveniently prepared by starting with about 0.10 mole of either p-methoxybenzaldehyde or p-heptyloxybenzaldehyde, depending upon the product desired. The starting compound is refluxed with p-trifluoromethylaniline for about four hours in about 100 cc of absolute ethanol to which a trace of p-toluenesulfonic acid is added. The water produced in the reaction is removed by azeotroping over the 95% ethanol into a Dean-Stark trap. The reaction mixture is allowed to cool to room temperature and the crude product crystallizes from solution. The resulting product is recrystallized from hexane and yields about 0.06 moles of purified product. The purified p-methoxybenxylidene-p'-trifluoromethylaniline is mesomorphic from about 50° to about 87°C, and the purified p-heptyloxybenzylidene-p'-trifluoromethylaniline is mesomorphic from about 38° to about 82°.

The positive dielectric anisotropic materials, including positive dielectric anisotropic smectics, to be added to nematic liquid crystalline materials can be added in any amount so long as the resulting composition retains the nematic mesomorphic state. Similarly, when mixtures of positive and negative dielectric anisotropic nematics are to be utilized, the amount of negative dielectric anisotropic nematic can be added in any amount so long as the resulting composition has a net positive dielectric anisotropy. Negative dielectric anisotropy nematic liquid crystalline materials are well known in the art and need not be listed in detail herein. Typical suiitable negative dielectric anisotropy nematic liquid crystalline materials include N-(p-methoxybenzylidene)-p-butylaniline (MBBA); p-azoxyanisole (PAA); N-(p-ethoxybenzylidene)-p-butylaniline (EBBA); dl-4-(2-methylhexyl)-4'-ethoxy-α-chloro-transstilbene; pp'-methoxypentyltolane, ethoxybenzylidene-p'-amino-phenyl-3-methyl valerate, and trans-4-butyl-α-chloro-4'-ethoxystilbene.

Nematics of negative dielectric anisotropy having absorption bands in the visible include: p-(p-ethoxyphenylazo) phenyl heptanoate, p-(p-ethoxyphenylazo) phenyl undecylenate, 4,4'-bis(heptyloxy) azoxybenzene, p-(p-ethoxyphenylazo) phenyl hexanoate, 4,4'-bis(pentyloxy) azoxybenzene, p-(p-ethoxyphenylazo) phenyl valerate, 4-4'-bis(hexyloxy) azoxybenzene, 4,4'-dibutoxybenzene, p-(p-ethoxyphenylazo) phenyl crotonate, 4,4'-dibutoxyazoxybenzene, 4-4'-azoxydianisole, 4,4'-azoxydiphenetole, N-p-methoxybenzylidene-p-phenylazoaniline, and 4,4'-azodiphenetole.

Mixtures of liquid crystals can be prepared in organic solvents such as chloroform, petroleum ether and others which are typically evaporated from the mixture leaving the liquid crystal composition. Alternatively, the individual components of the liquid crystalline mixture can be combined directly by heating the mixed components above the isotropic transition temperature.

The above lists of typical suitable nematic liquid crystalline substances are intended to encompass mixtures of the above. These lists are intended to be representative only and are not to be construed as being exhaustive or limiting to the invention to the specific materials mentioned. Although any nematic liquid crystalline material provided in the twisted nematic structure is suitable for use in the present invention, it should be recognized that various different nematic liquid crystal substances will only possess the necessary properties which make them suitable for use according to the invention at some specific temperature range which may be at room temperature or substantially below or above room temperature. However, all of the various substances, mixtures or combinations thereof will function according to the method at some temperature. Typically, the materials of the invention will be used at or near room temperature. Thus, it is preferred to employ liquid crystal substances which have a liquid crystal state at or near room temperature. Generally speaking, the liquid crystal substances will preferably be in the liquid crystal state at the desired operational temperature.

Typical suitable thicknesses of films or layers of nematic liquid crystalline materials are from about 0.5 to about 50 microns, although any thickness which will provide the desired effect can be used.

The twisted nematic structure is provided by sandwiching the nematic liquid crystalline material between two substrates or electrodes treated to impart unidirectional homogeneous alignment wherein the homogeneous alignment direction of one substrate makes an angle between 0° and 90° with the homogeneous alignment direction of the other substrate.

The substrates or electrodes may be treated by any technique suitable for providing homogeneous alignment of the nematic liquid crystalline material. Typical suitable techniques include the Chatelain technique of unidirectional rubbing as disclosed in P. Chatelain, *Bull. Soc. Franc. Min. Crist.*, 66, 105 (1943); providing a coating of aligning agent in contact with layer 4 of nematic liquid crystalline material such as, for example, one of the homogeneous aligning agents listed in Vol. 61, No. 7, *Proceedings of the IEEE*, p. 823, July, 1973 in the article "Surface Produced Alignment of Liquid Crystals" by Kahn, Taylor and Schonhorn; and the so-called Janning Technique described by J. L. Janning in *Appl. Phys. Letts.*, 21, 173 (1972).

The nematic liquid crystalline material is provided in the twisted nematic structure by about 0° to about 90° angular displacement between alignment directions of the treated substrates. The Chatelain and other surface treatments for homogeneous alignment can be employed. The substrates can be treated for the same direction alignment and one rotated or twisted from about 0° to about 90° with respect to the other to provide the angular displacement, or one substrate can be treated at an angle with respect to the treatment for the other substrate in order to provide the angular displacement. The direction of angular displacement determines the chirality or sense of twist of the twisted nematic structure. The standard used herein is the direction going from the bottom substrate to the top substrate, within about 0° to about 90°. If the direction from the bottom substrate alignment direction to the top substrate alignment direction within 0° to 90° is counterclockwise then the chirality of the helix is left handed. If the direction from the bottom substrate alignment direction to the top substrate alignment direction within about 0° to about 90° is clockwise then the chirality of the helix is right handed.

The substrates or electrodes may be of any shape and the homogeneous alignment treatment may employ aligning agents and angular film deposition (Janning Technique). Further, the substrates may both be treated to have the same alignment direction and the top substrate is then twisted or rotated to form an angle of from about 0° to about 90° with the other. A clockwise rotation of the top with respect to the bottom results in a right-handed sense of twist. A counterclockwise rotation of the top with respect to the bottom results in a left-handed sense of twist.

Once the chirality or sense of twist is established it remains the same for when the cell is flipped over so that the former bottom substrate is now the top substrate. This can be easily visualized by crossing two pencils and viewing them from opposite sides.

At exactly 0° or no angular displacement there is homogeneous alignment of the nematic layers (all pointing in one direction). At exactly 90° angular displacement the chirality of the twisted nematic structure generally includes a predominance of one handedness with the presence of the other handedness. Exactly 0° and 90° are therefore not preferred in utilizing the twisted nematic structure and at 90° there is non-uniformity of chirality.

EXAMPLE I

A nematic liquid crystalline composition is prepared by mixing one part by weight p-cyanophenyl-p-butyl benzoate (available from Aldrich Chemical Co., catalog number 18-032-7) and one part by weight p-cyanophenyl-p-heptyl benzoate (available from Aldrich Chemical Co., catalog number 18-031-9).

A sandwich member is formed by placing the nematic solution between two quartz substrates treated by the Chatelain rubbing technique. Both substrates are rubbed uniformly in the same direction and, after the nematic solution is placed in the bottom substrate the top substrate is placed on the layer of solution and rotated clockwise about 45°. The nematic assumes the twisted nematic structure with a right-handed helix.

The about 290 nm to about 390 nm region of the absorption spectrum of the twisted nematic is analyzed with a Cary 15 Spectrophotometer. The analysis is shown in FIG. 1.

The sandwich member is placed in a Cary 61 Spectropolarimeter operating in the circularly dichroic mode and the circular dichroism spectrum of the twisted nematic is measured between about 290 nm and 390 nm. Circular dichroism is exhibited within the investigated region of the twisted nematic. The observed circular dichroism is shown in FIG. 1

EXAMPLE II

Example I is repeated except that the top substrate residing on the nematic layer is rotated counterclockwise with respect to the bottom substrate. The sense of twist in the nematic is left handed and the resulting positive circular dichroism is shown in FIG. 1 in dotted line.

EXAMPLE III

The sandwich member of Example I is heated above the isotropic temperature for the nematic liquid crystalline composition. While so heated, the same region of the absorption spectrum of the nematic composition is analyzed with a Carey 61 Spectropolarimeter operating in the circular dichroism mode. Circular dichroism is not exhibited.

The sandwich member is allowed to cool below the isotropic temperature and transforms from the isotropic to the twisted nematic structure. The circular dichroism of FIG. 1 (solid line) is exhibited upon cooling. This demonstrates that circular dichroism is present in the twisted nematic structure of the nematic composition but not in the non-liquid crystalline isotropic composition.

EXAMPLE IV

The sandwich member of Example I is prepared except that no rotation of substrates occurs. The nematic liquid crystalline composition is in the homogeneous nematic texture and exhibits no circular dichroism. This demonstrates that it is the twisted nematic structure rather than liquid crystallinity which exhibits circular dichroism. The clockwise rotation of the top substrate is then effected to provide a right hand twisted nematic structure of about 45° twist. Radiation of about 305 nm is passed through a linear polarizer, then through the sandwich member, and then through a quarter waveplate-linear polarizer combination and impinges on an observer's eye.

The quarter waveplate can be oscillated between two positions 90° apart, each position providing an orientation of the retardation axis of the quarter waveplate to the transmission direction of the second linear polarizer of about 45°. The intensity of light is detected for each of the two positions of the quarter waveplate retardation axis and is different; that is, the light intensity is more intense at one position than the other. The sandwich member is heated to the isotropic temperature of the liquid crystalline material and the light intensity becomes equal at both positions of the quarter waveplate.

The sandwich member is removed and the detection through the oscillating quarter waveplate is continued. It is noted that the light at each position is of equal intensity and that the intensity at each position is greater than the intensity observed at the respective position prior to removal of the sandwich member.

This demonstrates that the relative amounts of right handed and left handed circularly polarized light components is altered by the circular dichroism in the twisted nematic composition.

EXAMPLE V

The sandwich member of Example I is prepared as in Example I. The Carey 61 Spectropolarimeter is placed in the circular dichroism mode. (In the circularly dichroic mode, the spectropolarimeter normally emits alternately right hand and left hanad circularly polarized light pulses in equal intensity.) These pulses are of selectively variable wavelength and are produced by passing monochromatic light through a linear polarizer and a Pockel cell quarter waveplate (a single crystal of potassium dideuterium phosphate). When a voltage is applied across the cell, the normally uniaxial single crystal of potansium dideuterium phosphate biaxial with the plane containing the induced optical axes being inclined at 45° to the X and Y crystallographic axes. The single crystal is oriented such that the induced axes are at $\pm 45°$ relative to the plane of polarization of the linear polarizer. As a result, if the electric field produces a retardation of 90° ($\lambda/4$) between the components parallel to the induced axis, the emergent beam of light will be circularly polarized. By altering the voltage applied to the single crystal the retardation can be varied from 90° ($\lambda/4$) whereupon the emergent beam becomes elliptically polarized and contains unequal amounts of RHCPL and LHCPL. The voltage to the Pockel cell is adjusted to produce elliptically polarized light and the relative intensities of RHCPL and LHCPL at about 305 nm are noted.

The sandwich member is then placed in the Carey 61 and it is noted that the intensities of both RHCPL and LHCPL emerging through the sandwich have been diminished and, that the relative intensities of RHCPL and LHCPL emerging from the sandwich have been altered. That is, the ellipticity of the elliptically polarized light produced by the adjusted Pockel cell has been changed by passing through the sandwich member. The circular dichroism is of positive sign.

EXAMPLE VI

Example V is repeated except that, in preparing the sandwich member according to Example I, the top substrate is rotated counterclockwise about 45° and imparts a right-handed of twist or chirality to the resulting twisted nematic structure. Circular dichroism of negative sign is exhibited. The ellipticity of the elliptically polarized light has been changed by passing through the sandwich member.

EXAMPLE VII

The left handed twisted nematic sandwich member of Example VI is placed back to back with the right handed twisted nematic sandwich member of Example I, and both inserted in the Cary 61 Spectropolarimeter adjusted to produce elliptically polarized light. The intensity detector indicates that substantially the same relative amounts or intensities of right hand and left hand circularly polarized light (i.e., ratio of RHCPL to LHCPL) emerges from the combination as was present in the incident radiation but at an intensity below the original incidence intensity. The ellipticity change of one member cancels out that of the other member with zero net ellipticity change.

EXAMPLE VIII

The sandwich member of Example I is prepared as in Example I except that the glass substrates are coated with indium oxide and the indium oxide coatings are treated by the Chatelain rubbing technique. The twisted nematic structure of Example I is provided.

An A.C. voltage of about 50 volts at 10 KHz is applied to the indium oxide coatings, i.e., applying an electric field across the nematic, while the member is being examined as in Example I for circular dichroism. Upon application of the field, the nematic becomes homoeotropically aligned and circular dichroism is no longer observed in the absorption bands of the twisted nematic.

Example VIII demonstrates that the application of electric fields at or above the threshold for twisted nematic to homeotropic nematic transition extinguishes the circular dichroism.

EXAMPLE IX

Example VIII is continued by adjusting the A.C. voltage to about 1.9 volts A.C. at 10 KHz. The circular dichroism reappears and is more intense (of greater magnitude) than in Example I.

The voltages applied can be either D.C. or A.C. When the nematics employed contain ionic impurities, A.C. fields are preferably utilized at a frequency sufficient to prevent ion movement; i.e., dynamic scattering. The amount of voltage applied is above the tilt threshold discussed in 63, *J. Opt. Soc. Am.*, 1374 (1973), previously cited, and below the threshold level where transition to the homeotropic uniaxial nematic texture and extinction of circular dichroism occurs.

Referring now to FIG. 2 for a first embodiment of the invention, there is seen between substrates 12 a layer 11 of a twisted nematic liquid crystalline composition having an absorption band in the wavelength region of incident radiation 18. Radiation 18 is elliptically polarized light containing unequal amounts of RHCPL (right hand circularly polarized light) and LHCPL (left hand circularly polarized light). The nematic in layer 11 is in the twisted nematic structure with a left hand sense of twist or chirality. Emerging radiation 20 is less intense than incident radiation 18, contains unequal amounts of RHCPL and LHCPL and the relative amounts of RHCPL and LHCPL is altered from that of radiation 18.

FIG. 3 schematically depicts a second embodiment of the invention. Nematic liquid crystalline film 11 is contained between electrodes 25 electrically connected to variable voltage source VS. A voltage in the range between the tilt threshold and homeotropic texture threshold for the nematic composition is applied to selectively vary the intensity of the circular dichroism in the twisted nematic structure. At a first voltage level emerging radiation 20 is less intense than incident radiation 18 and contains a different ratio of unequal amounts of RHCPL and LHCPL. The ellipticity of the elliptically polarized light has been changed. At a second voltage level the emerging radiation 21 contains relative amounts of RHCPL and LHCPL that is different from that of radiation 20. Substrates 12 may comprise any suitable material, flexible or rigid, which is optically isotropic and transparent to the incident light radiation and which is non-reactive with the liquid crystalline film. Typical suitable materials include glass, fused silica and any other materials having the required characteristics.

Electrodes 25 typically comprise a conductive coating 26 on substrate 12. For example, NESA glass available from Pittsburgh Plate Glass comprises a glass substrate overcoated with tin oxide. Typical suitable conductive materials, among many, which can be used for conductive coating 26 include, aluminum, indium oxide, copper, silver, gold, chromium, indium and others.

While the invention has been described in detail with respect to various preferred embodiments thereof, it is not intended to be limited thereto but rather it will be appreciated by those skilled in the art that modifications and variations are possible which are within the spirit of the invention and the scope of the claims.

For example, a plurality of sandwich members can be employed to change the amount of RHCPL and LHCPL in incident light. Where the plurality is an even number as in Example VII the relative amounts of RHCPL and LHCPL will not change if all characteristics of the members are the same except chirality and if the chiralities are paired (that is, one left hand twisted nematic member paired with one right hand twisted nematic). For an even number plurality, the RHCPL and LHCPL components in the emerging light are present in the ratio one to the other as in the incident radiation but the amount of each has been changed relative to the amount of RHCPL and LHCPL in the incident light radiation. In the odd number plurality, even where all but one member are provided in matched pairs, the ratio of RHCPL to LHCPL (or vice versa) in the emerging light is altered from that of the incident radiation and the amount of RHCPL and LHCPL in the emergent beam is less than that of the incident radiation.

Further, one of the right hand and left hand circularly polarized light components in elliptically polarized light can be completely absorbed by the induced circular dichroism within the absorption band of the extrinsically optically inactive material leaving only the other handedness of circularly polarized light in the emergent beam of light. This effect is intended herein to be included in the phrase "altering the relative amounts of right hand circularly polarized light components in elliptically polarized light."

What is claimed is:

1. A method of altering the relative amounts of right-handed and left-handed circularly polarized light components in elliptically polarized light having a wavelength within a region of interest, comprising:
    a. providing an optical filter comprising a nematic liquid crystalline composition in the twisted nematic structure, said twisted nematic composition having an absorption band defining said region of interest; and
    b. directing a beam of elliptically polarized light comprising right-handed and left-handed circularly polarized light at a wavelength within said region of interest through said optical filter.

2. The method of claim 1 wherein said nematic liquid crystalline composition is of positive dielectric anisotropy.

3. The method of claim 2 wherein said optical filter is provided with two electrodes sandwiching said nematic liquid crystalline composition.

4. The method of claim 3 further including the step of applying, between said two electrodes, a voltage level between the tilt threshold for the twisted nematic structure of said nematic composition and the voltage threshold for transition of said nematic composition from the twisted nematic structure to the homeotropic texture.

5. The method of claim 4 further including the step of varying the applied voltage to a second level between the tilt threshold for the twisted nematic structure of said nematic composition and the voltage threshold for transition of said nematic composition from the twisted nematic structure to the homeotropic texture.

6. The method of claim 5 wherein said first voltage level is less than said second voltage level.

7. The method of claim 5 wherein said first voltage level is greater than said second voltage level.

8. The method of claim 1 wherein said nematic liquid crystalline composition comprises a smectic liquid crystalline material having positive dielectric anisotropy.

9. The method of claim 1 wherein said nematic liquid crystalline composition comprises a mixture of nematic liquid crystalline materials of positive and negative dielectric anisotropy, said composition having a net positive dielectric anisotropy.

10. The method of claim 1 wherein said region of interest lies within the optical transitions of the twisted nematic.

11. The method of claim 1 wherein said elliptically polarized light directed through said optical filter emerges as circularly polarized light.

12. The method of claim 1 wherein said nematic liquid crystalline composition comprises a mixture of p-cyanophenyl-p-butyl benzoate and p-cyanophenyl-p-heptyl benzoate.

* * * * *